(12) United States Patent
Campbell

(10) Patent No.: US 9,331,913 B2
(45) Date of Patent: May 3, 2016

(54) METHODS AND DEVICES FOR PACKET DATA NETWORK GATEWAY SUSPENSION FOR ACCURATE CHARGING IN AN EVOLVED PACKET SYSTEM

(71) Applicant: TELEFONAKTIEBOLAGET L M ERICSSON (PUBL), Stockholm (SE)

(72) Inventor: Loudon Lee Campbell, Plano, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 14/066,158

(22) Filed: Oct. 29, 2013

(65) Prior Publication Data

US 2014/0119242 A1    May 1, 2014

Related U.S. Application Data

(60) Provisional application No. 61/719,730, filed on Oct. 29, 2012.

(51) Int. Cl.
| | |
|---|---|
| *H04W 4/24* | (2009.01) |
| *H04L 12/24* | (2006.01) |
| *H04L 12/26* | (2006.01) |
| *H04M 15/00* | (2006.01) |
| *H04L 12/14* | (2006.01) |

(52) U.S. Cl.
CPC ........ *H04L 41/5029* (2013.01); *H04L 43/0835* (2013.01); *H04M 15/39* (2013.01); *H04M 15/8292* (2013.01); *H04L 12/1435* (2013.01); *H04M 2215/14* (2013.01)

(58) Field of Classification Search
CPC .................................. H04W 4/24; H04M 15/39

USPC .......................................... 455/405, 406, 408
See application file for complete search history.

(56) References Cited

FOREIGN PATENT DOCUMENTS

| JP | 02003249945 A | * | 9/2003 |
|---|---|---|---|
| KR | 100702858 B1 | * | 3/2007 |
| WO | 0203725 A1 | | 1/2002 |
| WO | 2005015825 A1 | | 2/2005 |
| WO | 2011063543 A1 | | 6/2011 |

OTHER PUBLICATIONS

International Search Report and the Written Opinion of the International Searching Authority dated Apr. 4, 2014, in International Application No. PCT/IB2013/059756, 12 pages.

* cited by examiner

*Primary Examiner* — Kevin Kim
(74) *Attorney, Agent, or Firm* — Rothwell, Figg, Ernst & Manbeck, P.C.

(57) ABSTRACT

A method is implemented in a first node for charging of a mobile device in communication with the first node in a communications network. The method includes determining a number of data packets lost between the first node and the mobile device within a predetermined period. The method includes determining a packet loss rate using the number of data packets determined to be lost. The method includes determining whether a first predetermined condition is met based on an evaluation of the determined packet loss rate. The method also includes transmitting, by the first node after determination that the first predetermined condition is met, a notification to a second node causing the second node to stop charging the mobile device for packets sent to the mobile device.

18 Claims, 14 Drawing Sheets

METHODS AND DEVICES FOR PACKET DATA NETWORK GATEWAY SUSPENSION FOR ACCURATE CHARGING IN AN EVOLVED PACKET SYSTEM

CROSS REFERENCE TO RELATED APPLICATIONS

The present application claims the benefit of priority under 35 U.S.C. §119(e) to provisional application 61/719,730 titled "PGW Suspension for Accurate Charging in EPS," filed on Oct. 29, 2012, the entire contents of which are incorporated herein by reference.

TECHNICAL FIELD

This disclosure relates generally to suspension of data transmissions for accurate charging and, more particularly, to methods and devices for packet data network (PDN) gateway (PGW) suspension for accurate charging in an evolved packet system (EPS).

BACKGROUND

FIG. 1 illustrates an example EPS network architecture. A User Equipment (UE) 100 may interact with the EPS network using the Evolved Universal Terrestrial Radio Access Network (E-UTRAN) radio access 102. UE-related control signaling (S1-MME) is handled by Mobility Management Entity (MME) 104 with support of subscription information provided by the Home Subscriber Server (HSS) 106. User payload is handled by the SGW 108 and the PGW 110. The PGW 110 may interact with a Policy and Charging Rules Function (PCRF) 112.

The PGW 110 and SGW 108 collect charging information. This data is sent to a Charging Control Function over an Rf interface or stored to a local disk. A Gn/Gp SGSN and a GGSN charge for GSM/EDGE Radio access network (GERAN)/Universal Terrestrial Radio Access Network (UTRAN) access where the Gn/Gp serving general packet radio service (GPRS) support node (SGSN) role is similar to the SGW 108 role and the gateway GPRS support node (GGSN) role is similar to the PGW 110 role.

The PGW 110 tracks the number of packets and number of bytes forwarded by the PGW 110 in the uplink direction and separately in the downlink direction. This tracking is done for each EPS bearer separately. PGW 110 can also split one EPS bearer into more than one IP flow for charging purposes (SDF flows). PGW 110 can also implement online charging functions (e.g. checks of end user credit). These are reasons why an operator may prefer to use PGW 110 charging records. The SGW 108 tracks the number of packets and number of bytes forwarded by the SGW 108 in the uplink direction and separately in the downlink direction. This tracking is done for each EPS bearer separately.

Many problems are associated with using the PGW charging collection information in the downlink direction. In the uplink direction, the user plane packets have already passed the radio, eNodeB, SGW and PGW (if permitted). Therefore, uplink data that was successfully sent to the Internet (or similar network) is accurately reflected at the PGW. However, the PGW is completely unaware of whether the UE is in the Evolved Packet System Connection Management (ECM) connected state or the ECM idle state. Hence, the PGW charges for downlink data even though the SGW does not attempt to send data to the UE while the UE is in the ECM idle state.

Therefore, the PGW almost always overcharges the end user for downlink data (possibly in very large quantities). Since an operator in a non-roaming situation has the ability to take charging records from both the SGW and PGW, where the PGW records for the downlink direction are compared to the SGW records, the actual billing is adjusted proportionately by the billing systems. However, the method assumes that the SGW charging record is collected. Furthermore, many operators want to depend solely on PGW charging records. Also, in roaming cases, the PGW charging records and SGW charging records can be very much out of sync making "reconciliation/mediation" of the differences difficult.

FIGS. 2 and 3 are sequence diagrams illustrating common problem scenarios. Particularly, FIG. 2 illustrates the scenario where, when the UE is out of coverage, the UE is slow to respond, and there is a large burst of downlink data while the UE is idle. For example, as illustrated in FIG. 2, the PGW sends a large burst of downlink data (200) to the SGW. However, since the UE is out of range, the data at the SGW cannot be transmitted to the UE, and the data buffer of the SGW becomes filled up leading to data drops (202A, 202B). The SGW receives notification of downlink data failure (204) after the UE has failed to respond to multiple pages (206A, 206B, 206C) from the MME. When this occurs, all buffered data for the UE is dropped (208), and the SGW does not charge the UE for the downlink data (210). However, the PGW charges the UE for all downlink data (212), which is incorrect.

A problem also exists even if the UE responds on the first page (206A). For example, consider a User Data Protocol (UDP) downlink stream at 8 Megabits/sec with 1500 bytes per packet (i.e., 666 packets per second). A UE idle mode discontinuous reception (DRX) cycle can be as high as 2.56 seconds. Therefore, up to 2.56×666=1707 packets, and 2.56 Megabytes of data may be sent even before the UE responds to a page with perfect operation of all entities.

FIG. 3 illustrates a situation where SGW determines that the UE is in the ECM idle state upon receiving the S11 Release Access Bearer Request (300). There is a potential mismatch between PGW and SGW records after this point due to the UE being in the ECM idle state if downlink packets still come in at high rate (see previous example at 8 Megabits/sec). This situation is qualitatively similar to the previous case. However, there is also a quantitative difference with respect to the previous case. First, abnormal radio release (302) means that the UE had radio coverage at one point, but the radio degraded and the eNodeB was unable to handover the UE to a better cell, and the UE subsequently lost RRC abnormally. The UE is also very likely to be temporarily out of coverage at this point. So any downlink at this time is very likely to result in paging failure. Second, downlink data rates over TCP while a UE is in the ECM idle state are only expected when the UE was very recently ECM connected, either because connection was good and TCP receive window was large on the UE, or because connection was bad and major TCP downlink retransmissions were occurring in the downlink direction. Therefore, this special case is a more acute case of the general case and warrants special handling. As illustrated in FIG. 3, even after reception of the request 300, the PGW continues to transmit data that is charged to the UE.

An identical situation exists in UTRAN/GERAN accesses except state ECM-IDLE is replaced with PMM-Idle or Standby, and ECM-Connected is replaced with PMM-Connected.

SUMMARY

According to exemplary embodiments, a method is implemented in a first node for charging of a mobile device in communication with the first node in a communications network. The method includes determining a number of data packets lost between the first node and the mobile device within a predetermined period. The method includes determining a packet loss rate using the number of data packets determined to be lost. The method includes determining whether a first predetermined condition is met based on an evaluation of the determined packet loss rate. The method also includes transmitting, by the first node after determination that the first predetermined condition is met, a notification to a second node causing the second node to stop charging the mobile device for packets sent to the mobile device.

According to some exemplary embodiments, a first node communicating with a second node and a mobile device in a communication network is provided. The first node includes a processor, a memory coupled to the processor, a transceiver coupled to the processor, and an antenna coupled to the transceiver configured to transmit and receive message. The processor is configured to determine a number of data packets lost between the first node and the mobile device within a predetermined period. The processor is further configured to determine a packet loss rate using the number of data packets determined to be lost. The processor is further configured to determine whether a first predetermined condition is met based on an evaluation of the determined packet loss rate. The processor is also configured to transmit, after determination that the first predetermined condition is met, a notification to a second node causing the second node to stop charging the mobile device for packets sent to the mobile device.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
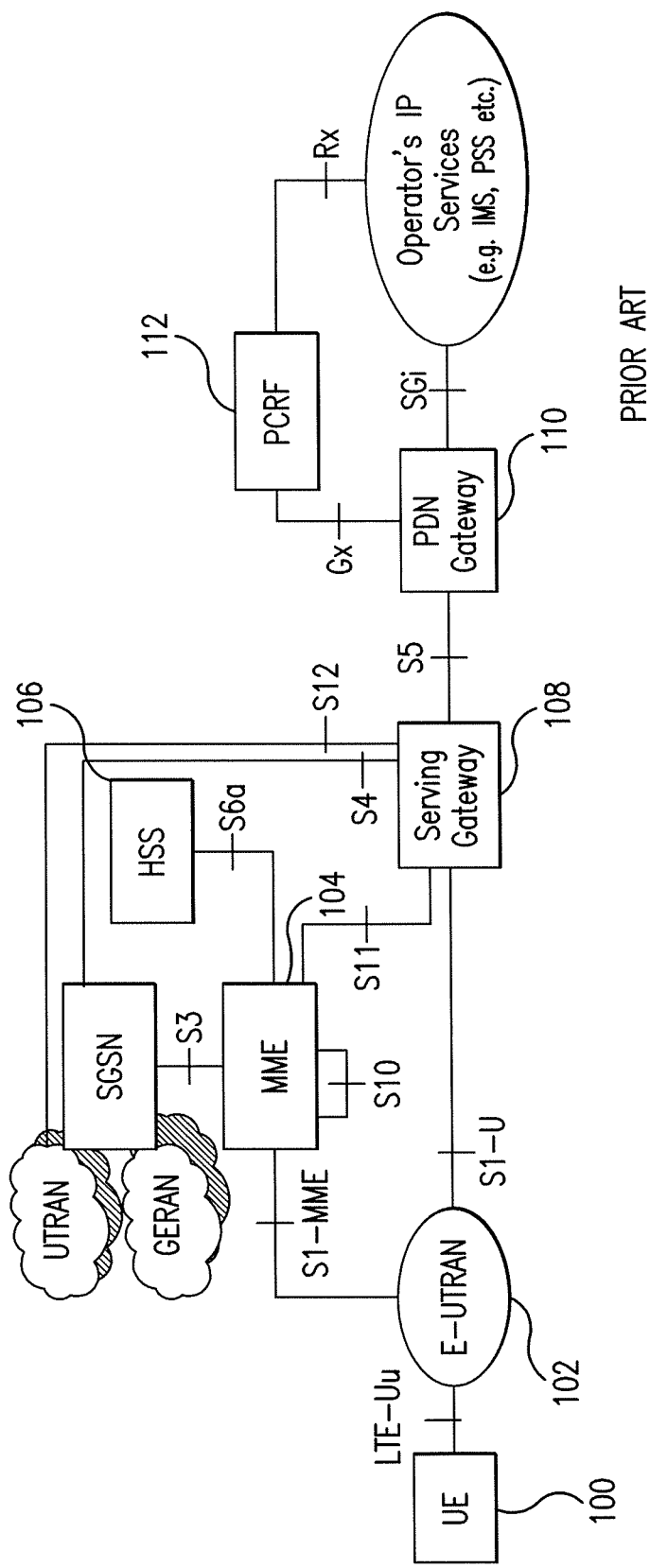
FIG. 1 is an illustration of a non-roaming architecture for an EPS.
Figure 2:
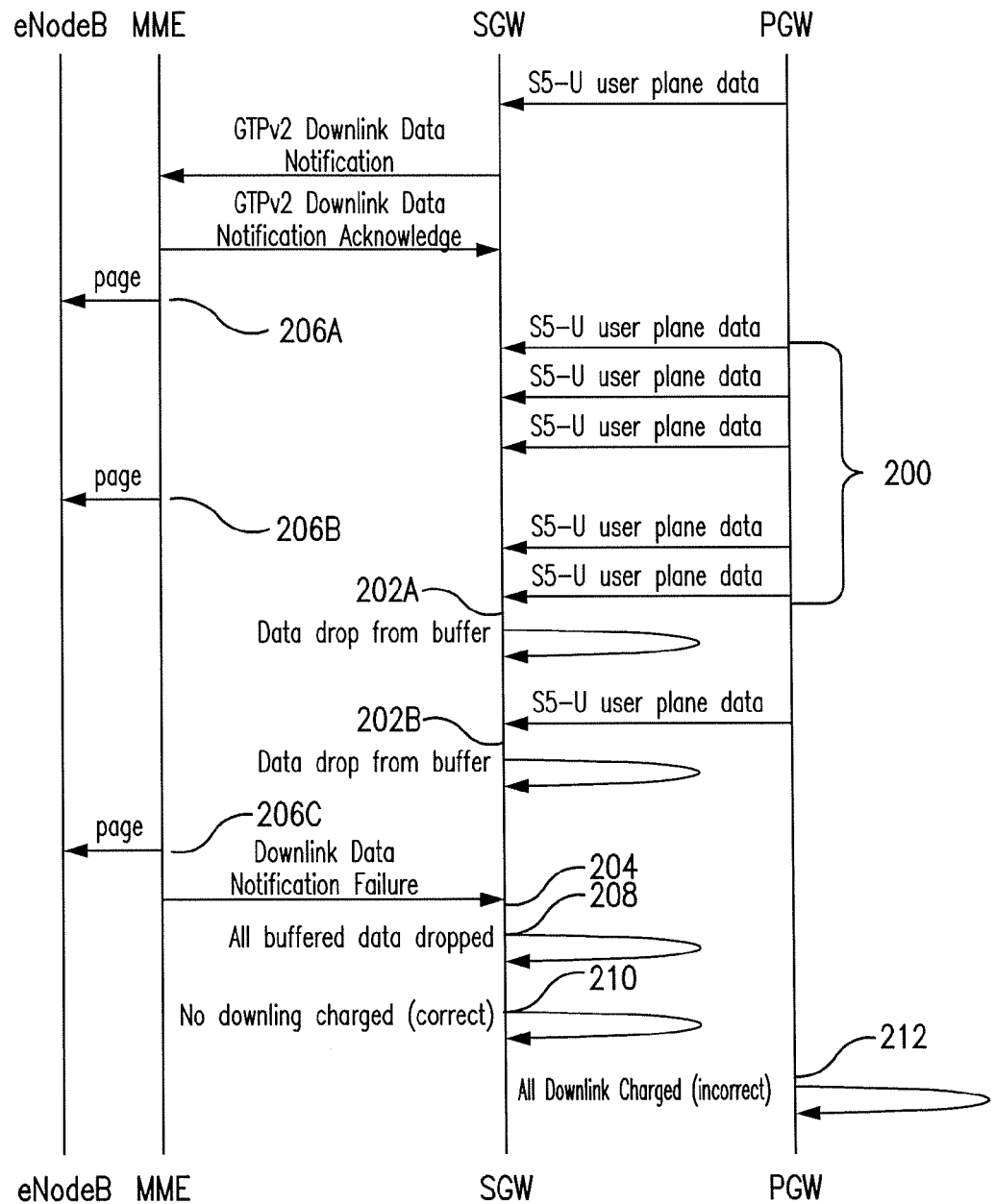
FIGS. 2 and 3 illustrate common problem scenarios regarding inaccurate charging of the UE.
Figure 3:
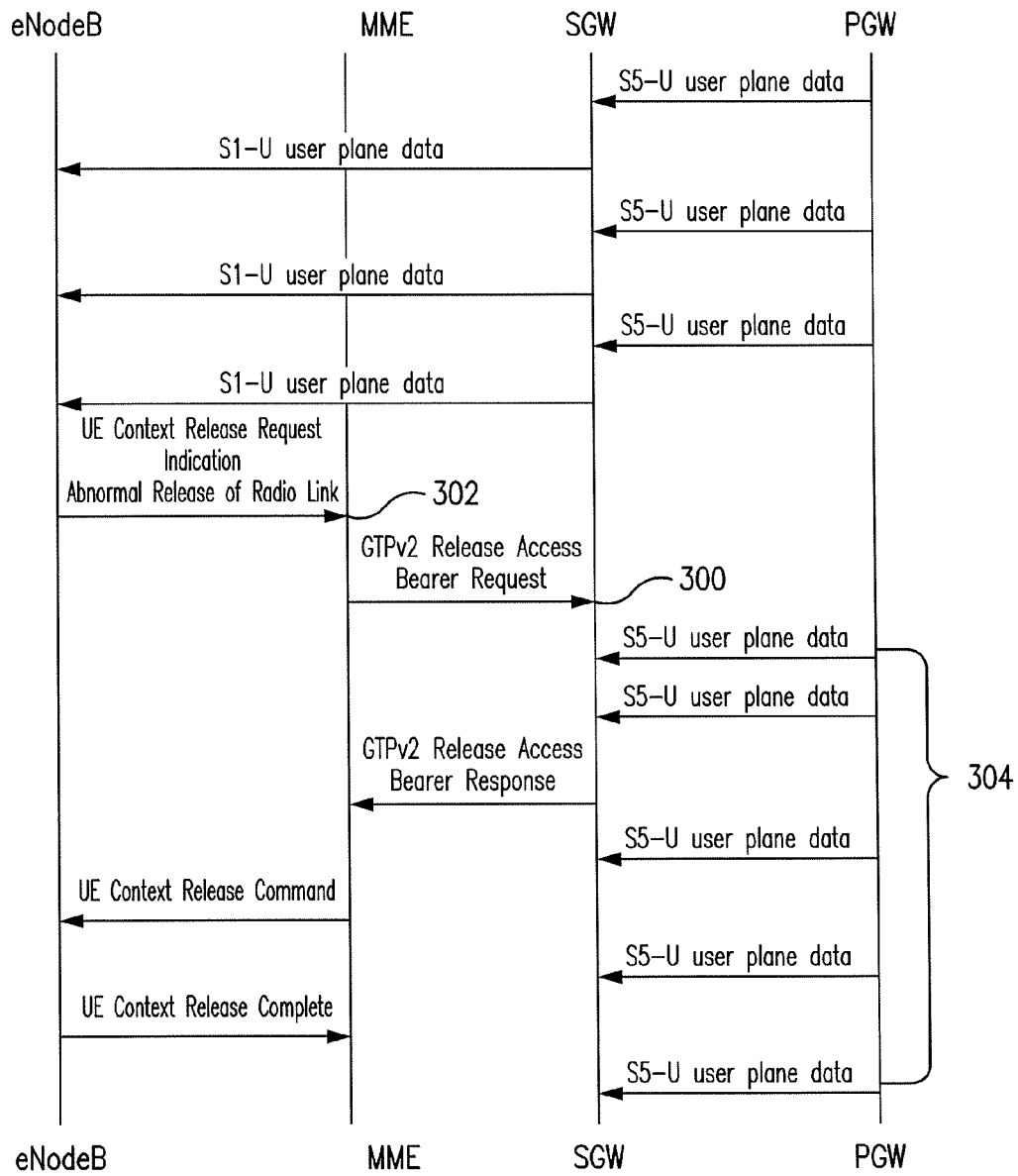
Figure 4:
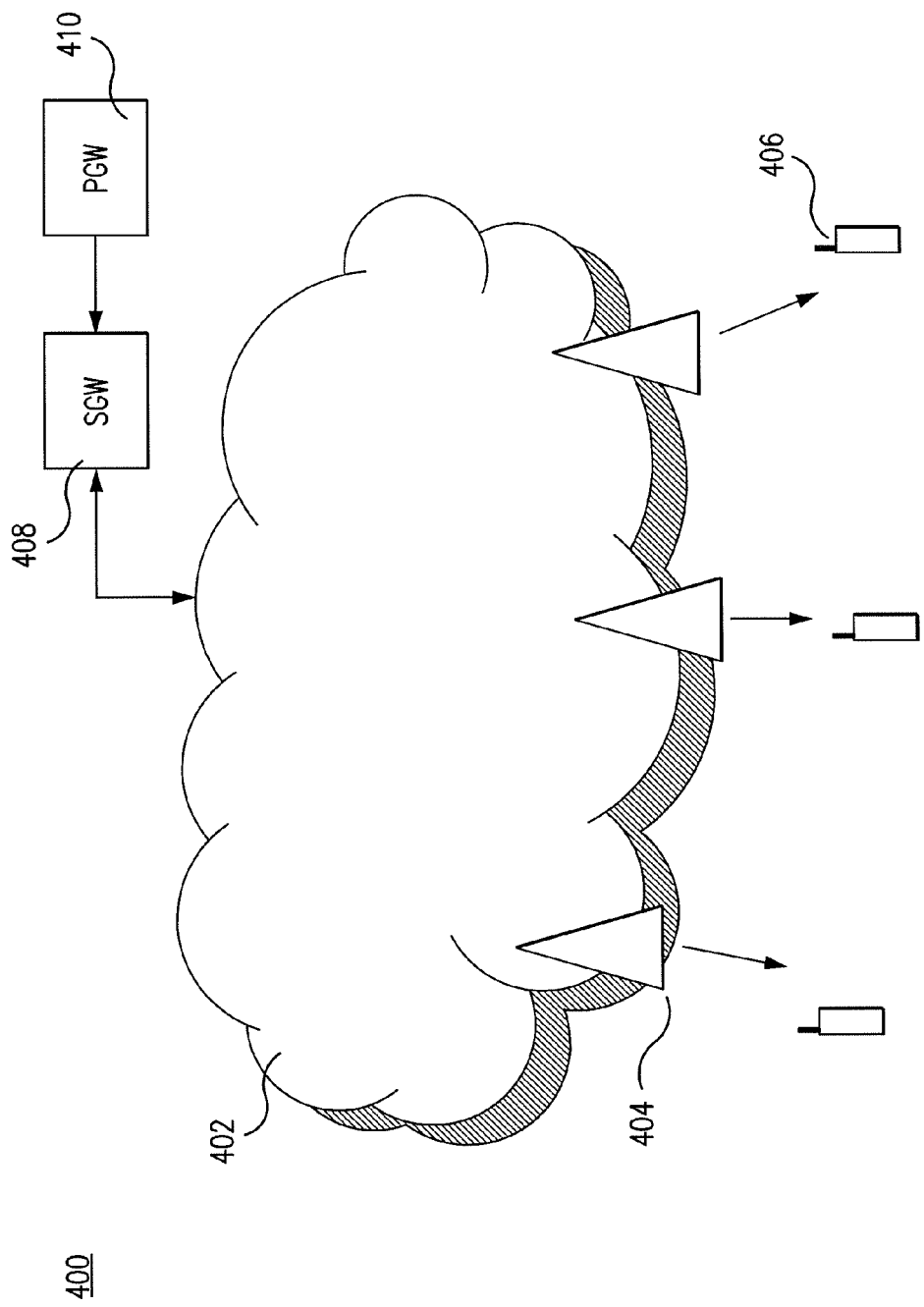
FIG. 4 is an illustration of an exemplary wireless communication system in accordance with exemplary embodiments.

Referring to FIG. 4, a wireless communication deployment 400 in accordance with exemplary embodiments includes an access node 404 serving a wireless communication device (WCD) 406. Examples of WCDs include, but are not limited to, mobile telephones, user equipments (UEs), personal digital assistants, electronic readers, portable electronic tablets, wireless sensors, machine communication devices, personal computers, and laptop computers. Furthermore, the device 406 may be a legacy UE or dynamic TDD capable UE. Access node 404 may be, for example, a base station, an eNodeB, relay node, or gateway type device, and is capable of communicating with device 406, along with any additional elements suitable to support wireless communication between wireless communication devices or between a wireless communication device and another communication device, such as landline telephone. The access node 404 may be in communication with, for instance via a network 402, one or more control nodes, such as a Radio Network Controller (RNC), a Mobility Management Entity (MME), a Mobile Switching Center (MSC) or Base Station Subsystem (BSS), or one or more gateway nodes such as SGW 408 and PGW 410. It is noted that each of nodes 404, 406, 408, and 410 may be understood as a "control" node to the extent that it includes a control unit or otherwise implements control functions.

According to some embodiments, the PGW is not signaled at every ECM idle to ECM connected transition to prevent too much signaling on S5/S8 GTPv2-C. Embodiments include the SGW signaling the PGW to indicate that a UE is in the ECM idle state or the ECM connected state. The MME may not be aware of how much data is being sent from the PGW and how many packets are being discarded at the SGW. Generally, the SGW is aware that the UE is in the ECM idle state and is aware of how many user plane packets are being dropped by the SGW due to the UE being in the ECM idle state.

According to some embodiments, the SGW tracks when data has been dropped in the downlink while the UE is in ECM idle state. When a threshold of detected dropped downlink data has been reached while the UE is in the ECM idle state, the SGW behaves towards the PGW as if the MME/S4-SGSN had initiated a CS fallback procedure towards the SGW. The SGW may also start a timer. When the UE becomes ECM connected again, or the timer expires, the SGW behaves as if the MME/S4-SGSN had initiated a PS resume towards the SGW. In some embodiments, between the suspend and resume procedures, the PGW does not send downlink data, which avoids the majority of the downlink data overcharging in the PGW. This method is also applicable between a Gn SGSN and a GGSN.

Figure 5:
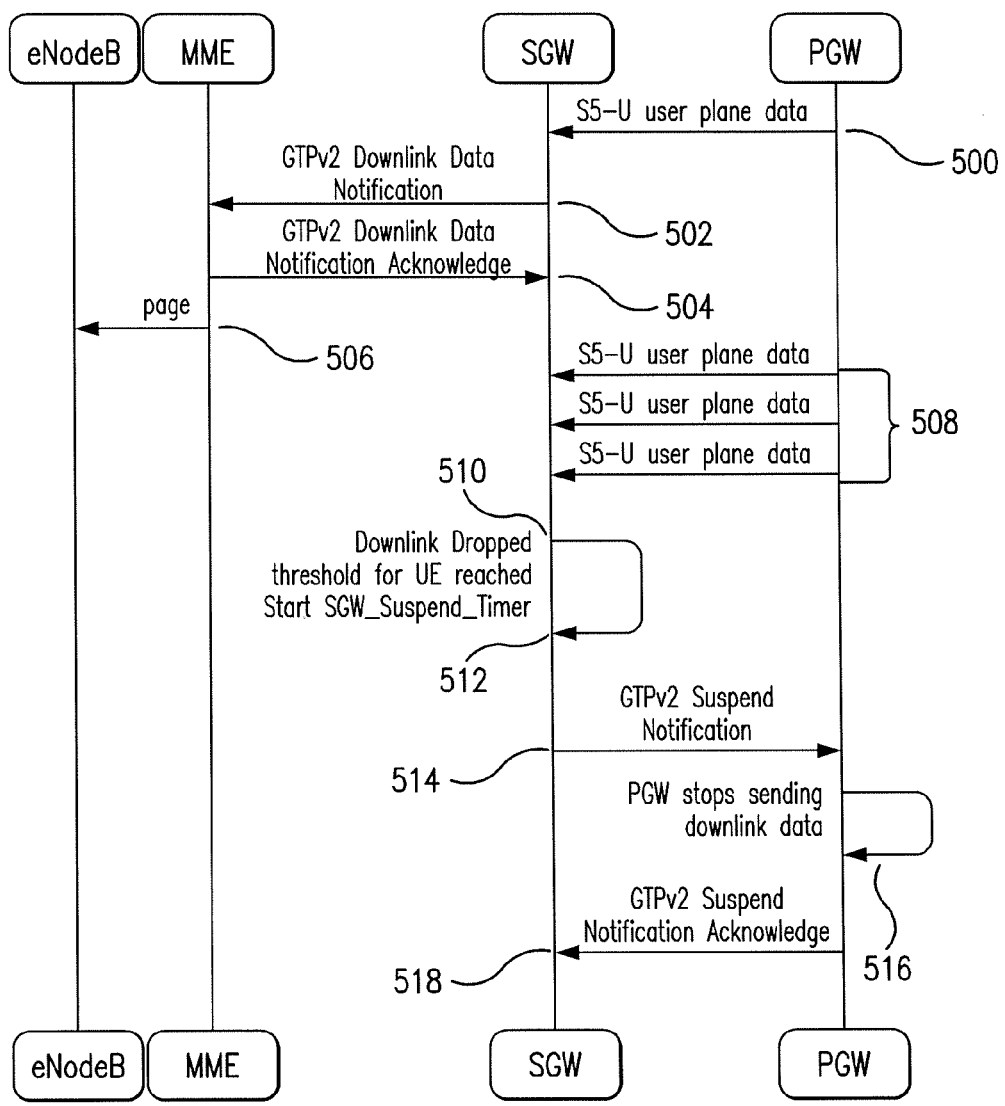
FIG. 5 is an illustration of an exemplary sequence diagram regarding suspending data transmissions.

FIG. 5 illustrates an exemplary sequence diagram in which the UE is in the ECM idle state. When the PGW transmits initial data (500) for the UE, the SGW transmits a downlink data notification to the MME (502). The MME transmits a data notification acknowledgement to the SGW (504) and a page to the UE (506). However, since the UE is in the ECM idle state, no return page is received, and the data for the UE buffered at the SGW is not transmitted. Additionally, as the PGW continues to send data (508) to the SGW, the buffer at the SGW becomes overfilled, and the SGW experiences packet loss. In some embodiments, the SGW records the bytes lost and packets dropped in the SGW in the downlink direction due to the UE being in the ECM idle state. In some embodiments, the SGW records the bytes lost and packets dropped on a per UE basis. Furthermore, the SGW may record the bytes lost and the packets lost on a per bearer basis.

According to some embodiments, when the SGW detects that the rate of dropped packets or dropped bytes exceeds a predetermined threshold, the SGW determines that the UE is in the ECM idle state (510). An example threshold includes 8 packets dropped in 10 seconds (i.e., 0.8 packets/sec). In some embodiments, upon this determination, the SGW sends a Suspend Notification message (e.g., S5/S8) for that UE (514). Furthermore, the SGW may also start a timer (512) upon determination that the UE is in the ECM idle state. Upon receiving the suspend notification, the PGW stops sending downlink data (516) destined for the UE. The PGW may further send an acknowledgement of the suspend notification (518). Accordingly, when the PGW stops sending downlink data (516) upon reception of the suspend notification, the UE is not charged for packets at this point while the UE is in the ECM idle state. In some embodiments, the SGW may include a predetermined number of dropped packets (i.e., 8 packets) in the suspend notification. Upon receiving the suspend notification with this predetermined number, the PGW may provide the UE with a credit in the amount of the predetermined number (i.e., 8 packets are removed from UE's bill).

Figure 6:
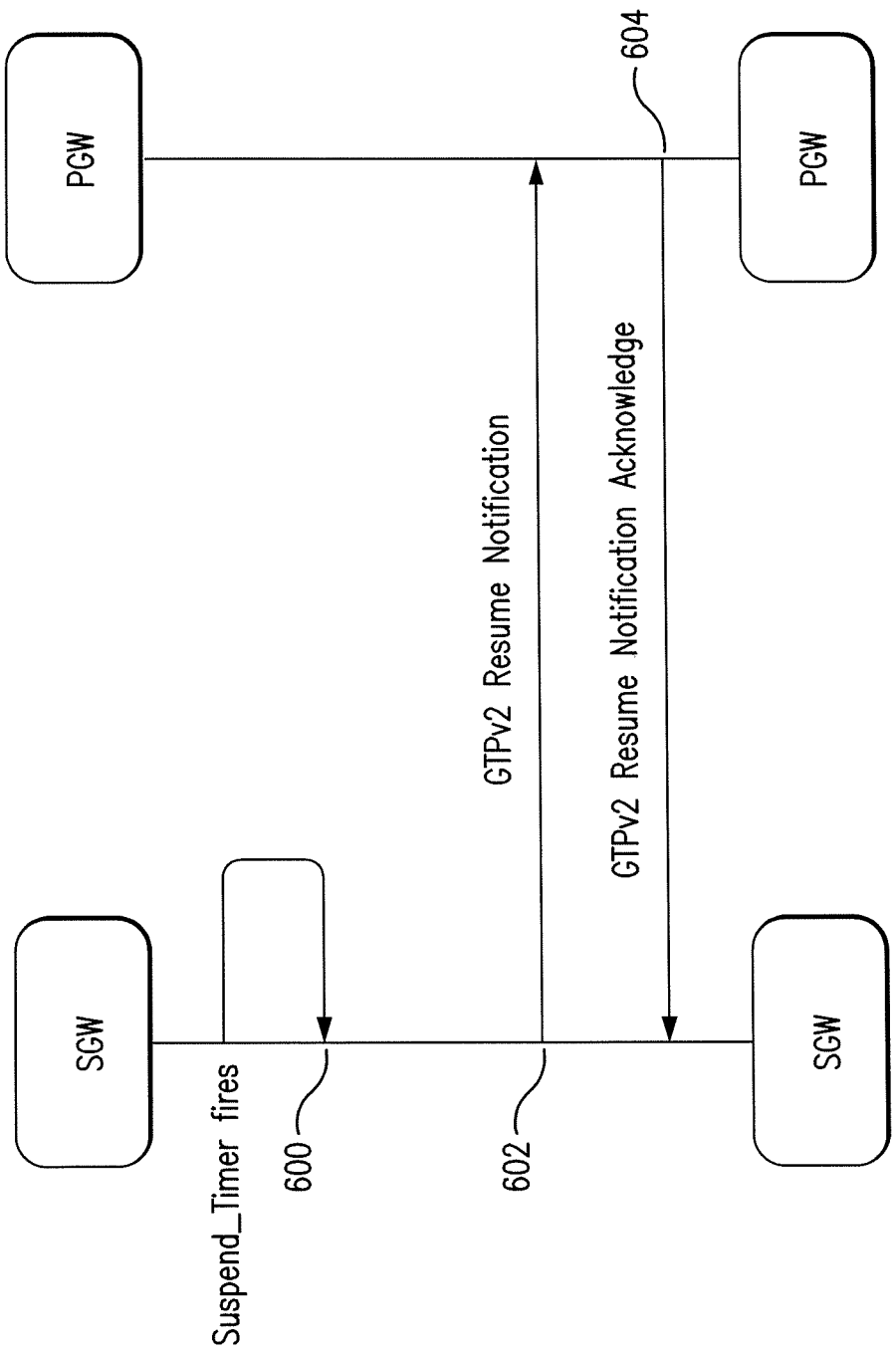
FIGS. 6 and 7 illustrate exemplary sequence diagrams regarding resuming suspended data transmissions.

FIG. 6 illustrates an example sequence diagram of an embodiment for resuming data transmissions from the PGW to the UE. In some embodiments, if the time expires without receiving indication that the UE is in the ECM connected state (600), the SGW sends a resume notification (e.g., S5/S8) to the PGW (602), and the PGW responds with an acknowledgment notification (604). Upon receiving the resume notification (602), the PGW resumes transmitting packets destined for the UE to the SGW where the PGW charges the UE for each packet transmitted from the PGW.

Figure 7:
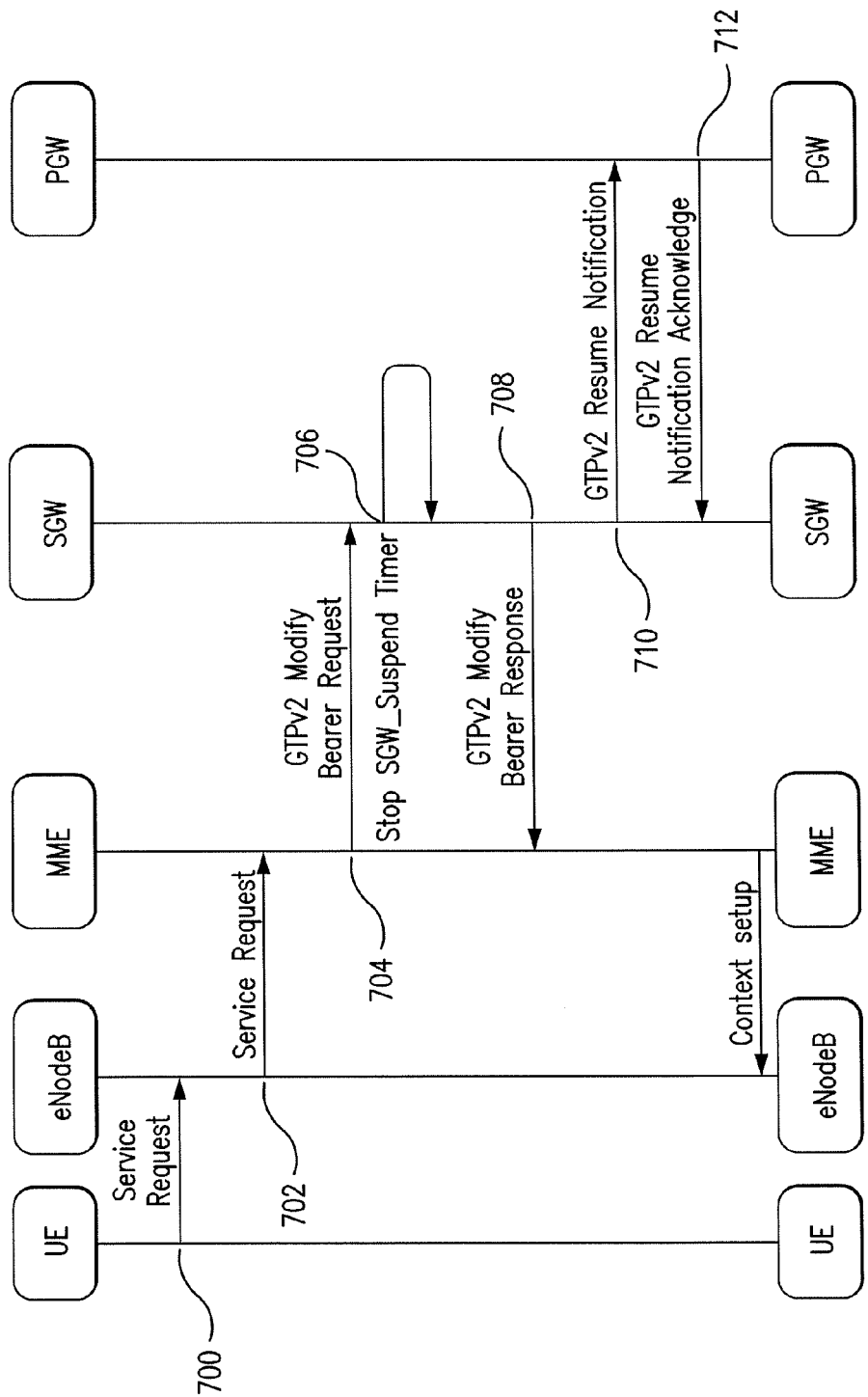

FIG. 7 illustrates an example sequence diagram of another embodiment for resuming data transmissions from the PGW to the UE. If the UE switches from the ECM idle state to the ECM connected state, the UE sends a service request to the base station (700), and the base station sends a service request to the MME (702). The MME subsequently sends a modify bearer request (704) to the SGW. The modify bearer request (e.g., S4/S11 Modify Bearer Request) (704) provides indication to the SGW that the UE is in the ECM connected state. A create session request (e.g., S4/S11 Create Session Request with eNodeB F-TEID) also provides indication to the SGW that the UE is in the ECM connected state. If the timer is running and has not expired upon reception of the bearer request (704), the timer is suspended and canceled (706), and the SGW sends a modify bearer response (708) to the MME. The SGW further sends the resume notification (710) to the PGW. The PGW may respond with a notification acknowledgment (712).

According to some embodiments, PGW pauses the charging of the UE upon reception of a pause notification from the SGW. As an example, while the PGW charging is paused, the PGW continues to send downlink data to the SGW. Neither the SGW nor the PGW charges for this downlink data. This downlink data from the PGW may act as a trigger for S11 Downlink Data Notification from the SGW to the MME. However, the SGW, based on operator policy at the SGW, may or may not forward this data to the UE.

This option avoids possible attempts at fraud if this data were received for free at the eNodeB. The operator decides the trade-off between free service for a few packets versus better end user experience for downlink triggered services. Even if this downlink data is not forwarded, the UE regains access to the downlink stream for subsequent packets as soon as the UE is in the ECM connected state after being paused.

According to some embodiments, a new Indication IE flag is added to the S5/S8 Modify Bearer Request to indicate "support/enabling of charging pause." The IE flag allows for a PGW to "pause" the PGW charging and to still trigger downlink pages at the SGW based on new downlink data received on the SGi interface. Since, in this embodiment, the SGW originates the S5/S8 Modify Bearer Request to pause charging while the UE is in the ECM idle state, this S5/S8 Modify Bearer request may be an "empty" Modify Bearer Request with no other message content (e.g., no bearers to be modified, which is very similar to the S5/S8 Modify Bearer Request sent in a non-3GPP to 3GPP non-optimized handover).

In some embodiments, on the S5/S8 interface, the IE flag in the SGW to PGW direction indicates support of the pausing feature. This bit in the PGW to SGW direction indicates that the PGW wants to enable the feature in the SGW for that PDN. Specifically, in one embodiment, the indication flag is included in S5/S8 Create Session Request for Attach, and PDN activation, and S5/S8 Modify Bearer Request for inter SGW mobility procedure indicates support of the new feature in the SGW to the PGW. If the SGW does not indicate support, the PGW continues to operate with either the suspension mode described above, or in a conventional manner. If the SGW does indicate support, and the PGW does support the pausing feature, the PGW may make a decision based on a local PGW configuration in the Access Point Name (APN) profile and/or roaming agreements to enable or not enable the feature. The IE bit may be included in the corresponding response on S5/S8 back to the SGW. If the bit is set, the SGW enables the feature for the lifetime of the PDN on that SGW.

Figure 8:
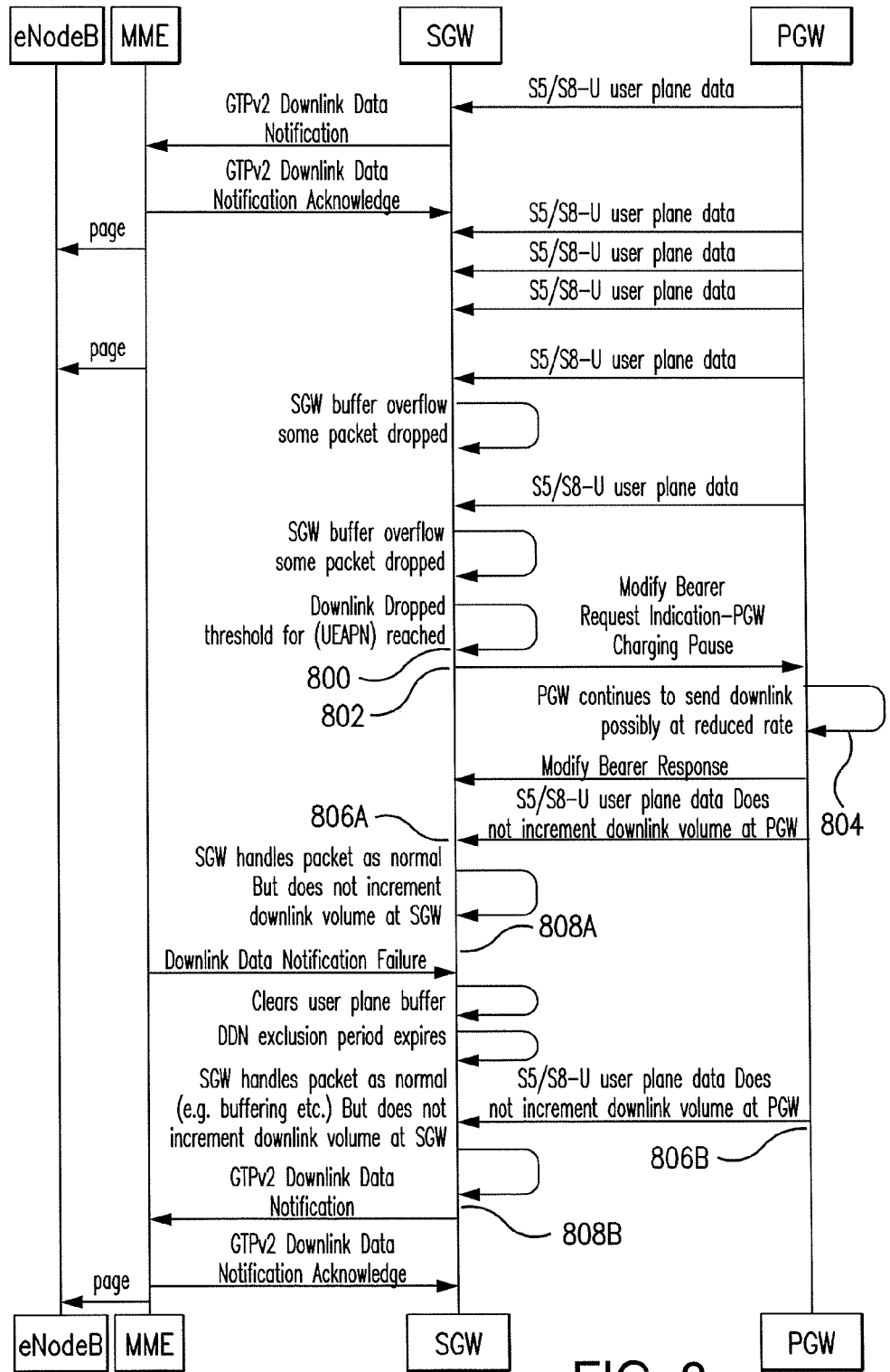
FIGS. 8 and 9 illustrate exemplary sequence diagrams for pausing charging of the UE

FIG. 8 illustrates an exemplary sequence diagram illustrating an embodiment of the pause feature. Particularly, if the UE is in the ECM idle state and the packet loss rate at the SGW exceeds a threshold (800), the SGW sends a pause notification (802) to the PGW. Upon receiving the pause notification, the PGW may continue to send packets destined for the UE (804, 806A, 806B), but not charge the UE for these packet. The SGW may then buffer the packets if the UE is in the ECM idle state, or transmit the packets to the UE if the UE is in the ECM connected state (808A, 808B).

Figure 9:
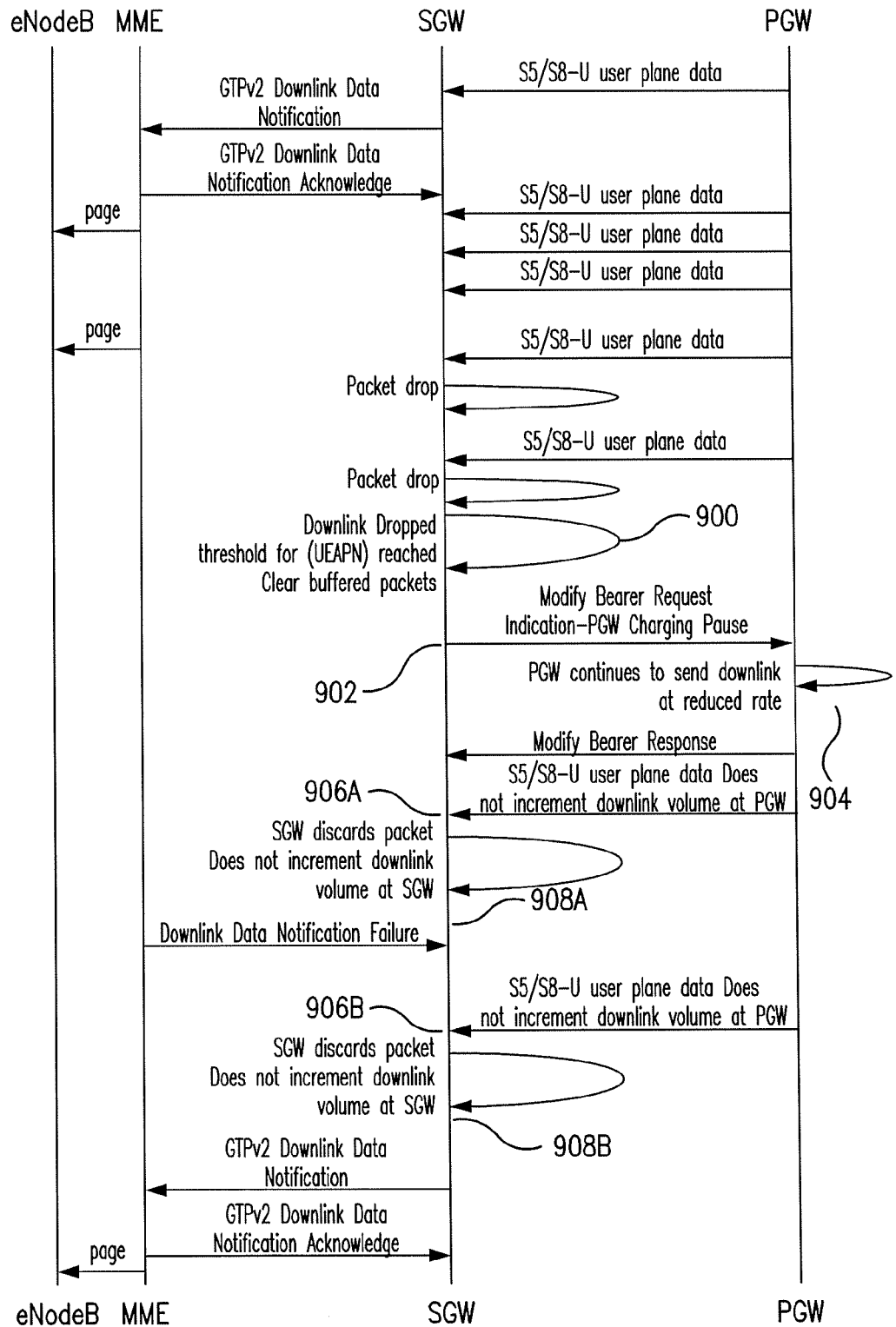

FIG. 9 illustrates an exemplary sequence diagram illustrating another embodiment of the pause feature. Particularly, if the UE is in the ECM idle state and the packet loss rate at the SGW exceeds a threshold (900), the SGW sends a pause notification (902) to the PGW. Upon receiving the pause notification, the PGW may continue to send packets destined for the UE (904, 906A, 906B), but not charge the UE for these packet. However, unlike the embodiment illustrated in FIG. 8, the SGW discards the packets instead of buffering the packets for transmission to the UE (908A, 908B).

Figure 10:
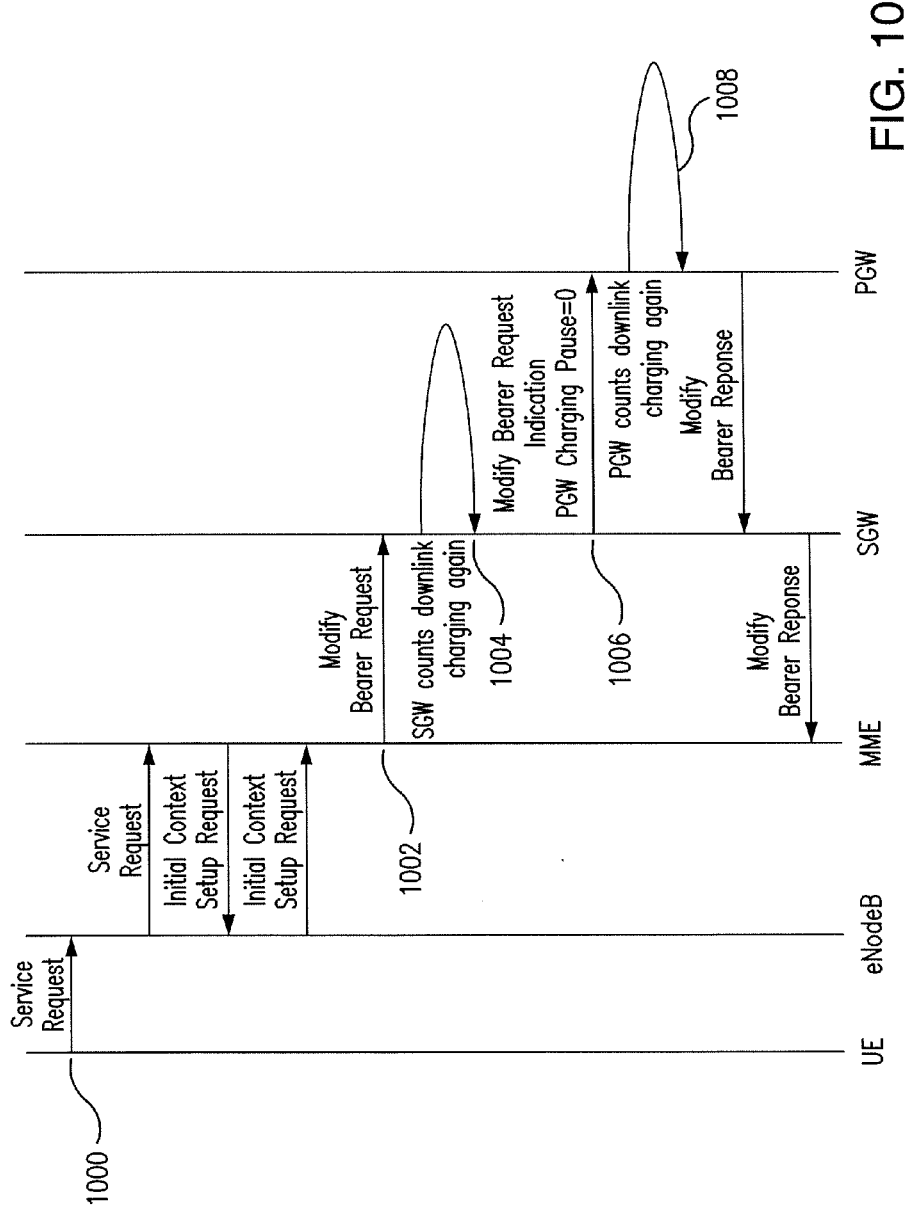
FIG. 10 illustrates an exemplary sequence diagram for resuming charging of the UE.

FIG. 10 illustrates an exemplary sequence diagram illustrating an embodiment of resuming charging of the UE from the pause mode. Particularly, when the UE enters the ECM connected state, the UE sends a service request to the base station (1000). The base station sends a modify bearer request to the SGW (1002). Upon receiving this request, the SGW resumes charging for downlink packets to the UE (1004), and sends a notification to the PGW to end pause mode (1006). Upon receiving this notification, the PGW resumes charging of downlink packets to the UE (1008).

Figure 11:
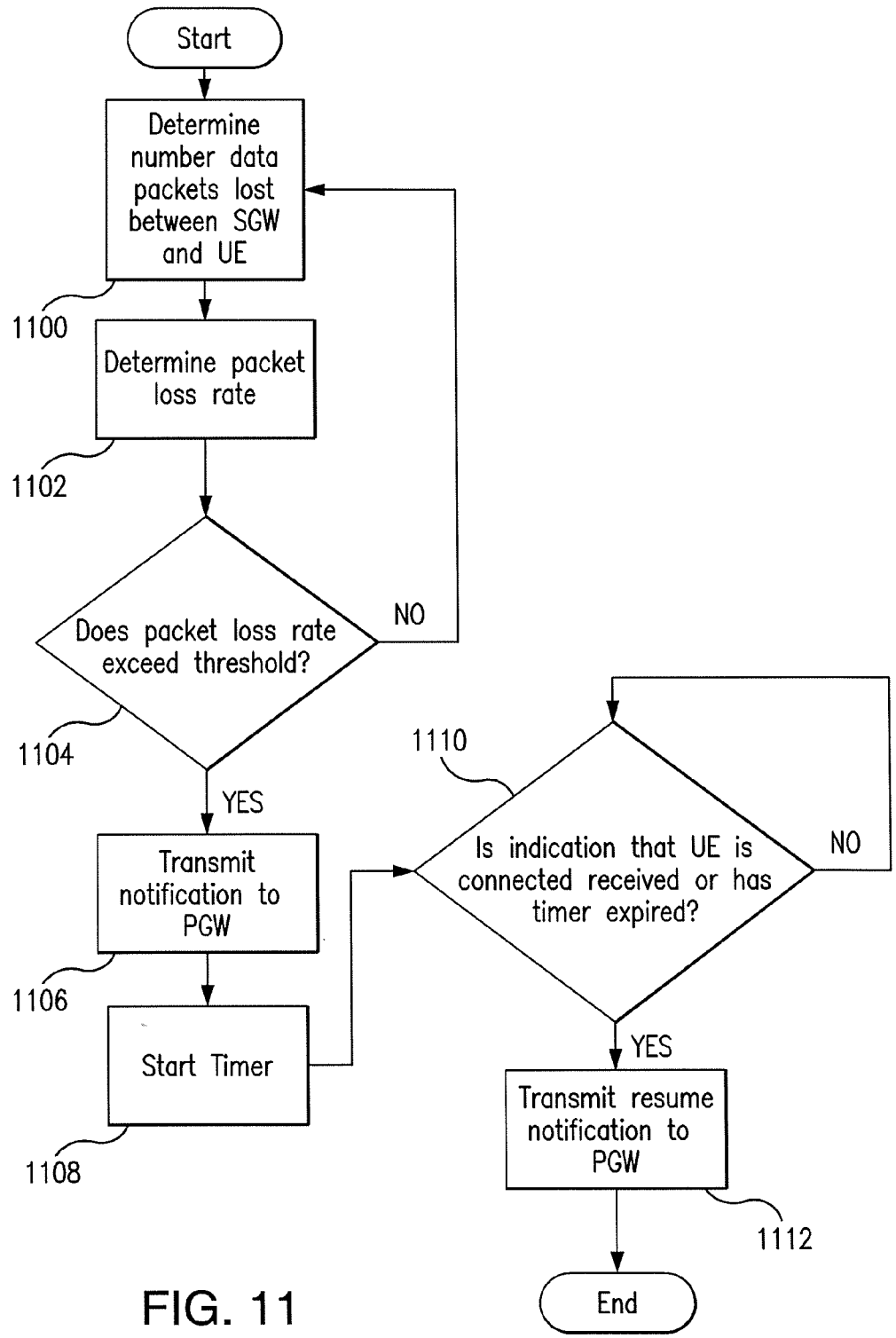
FIG. 11 illustrates a flow chart of an exemplary process for suspending data transmissions.

FIG. 11 illustrates a flow chart of an embodiment of a process for suspending transmission of data. The process illustrated in FIG. 11 may be performed by SGW 408 (FIG. 4). The process may generally start at 1100 where the SGW determines the number data packets lost between SGW and the UE. As discussed above, this situation may occur when the UE is in the ECM idle state and packets destined for the UE and transmitted from the PGW is buffered at the SGW. When the data buffer becomes filled up, packets stored in the buffer may be discarded if the UE is unavailable to receive the packets. The number of discarded packets for the UE is counted as the number of data packets lost for that particular UE.

The process proceeds to 1102 to determine the packet loss rate. The packet loss rate may be determined over a predetermined time interval (i.e., 5 ms). For example, if 100 packets are lost in a 5 ms interval, the packet loss rate is 20 packets/ms. The process proceeds to 1104 to determine if the packet loss rate exceeds a threshold. If the packet loss rate does not exceed a threshold, the process returns to 1100. If the packet loss rate exceeds the threshold, the process proceeds to 1106 where the SGW transmits a notification to the PGW. This notification may be a suspend notification or a pause notification as described above.

The process proceeds to 1108 where the SGW starts a timer. The process proceeds to 1110 where the SGW determines if indication that the UE is in a connected state is received or the timer has expired. If anyone of these conditions are met, the process proceeds to 1112 where the SGW transmits a resume notification to the PGW.

Figure 12:
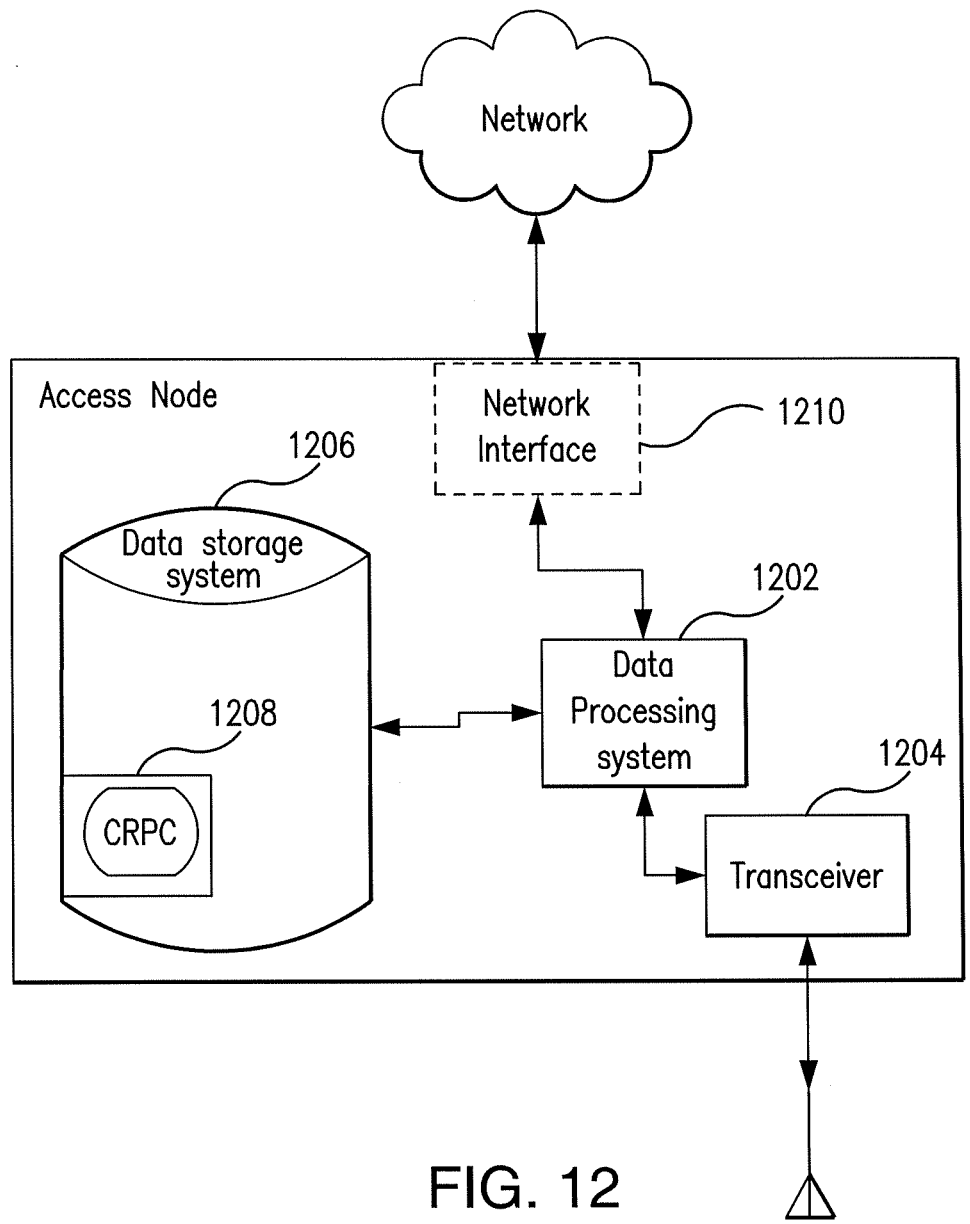
FIG. 12 illustrates an exemplary access node.

FIG. 12 illustrates a block diagram of an exemplary access node, such as node 404 shown in FIG. 4. As shown in FIG. 12, the access node 404 may include: a data processing system 1202, which may include one or more microprocessors and/or one or more circuits, such as an application specific integrated circuit (ASIC), field-programmable gate arrays (FPGAs), and the like; a network interface 1210; a transceiver 1204, and a data storage system 1206, which may include one or more non-volatile storage devices and/or one or more volatile storage devices (e.g., random access memory (RAM)). According to some embodiments, the data processing system 1202 may comprise a control unit used for selection of transmission parameters.

In embodiments where data processing system 1202 includes a microprocessor, computer readable program code (CRPC) 1208 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1202 to perform steps described above. In other embodiments, the access node 404 is configured to perform steps described herein without the need for code. That is, for example, data processing system 1202 may consist merely of one or more ASICs. Hence, the features of the embodiments described herein may be implemented in hardware and/or software. For example, in particular embodiments, the functional components of the base station described above may be implemented by data processing system 1202 executing computer instructions, by data processing system 1202 operating independent of any computer instructions, or by any suitable combination of hardware and/or software.

Figure 13:
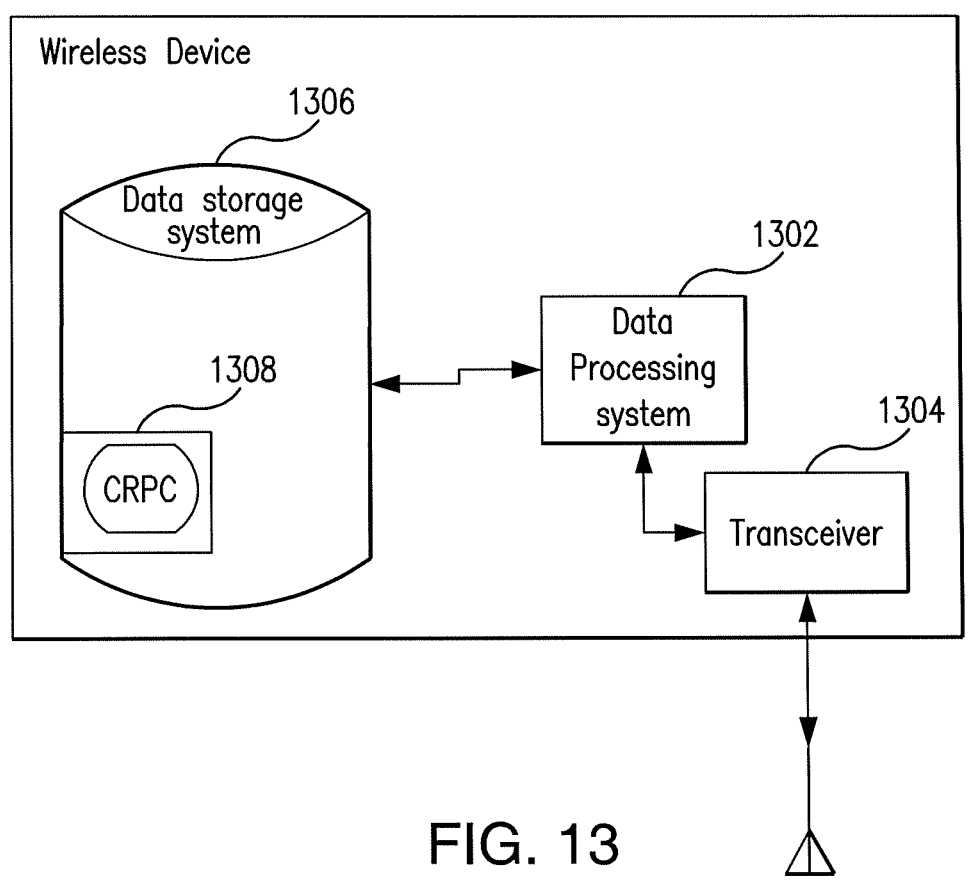
FIG. 13 illustrates an exemplary wireless device.
Figure 14:
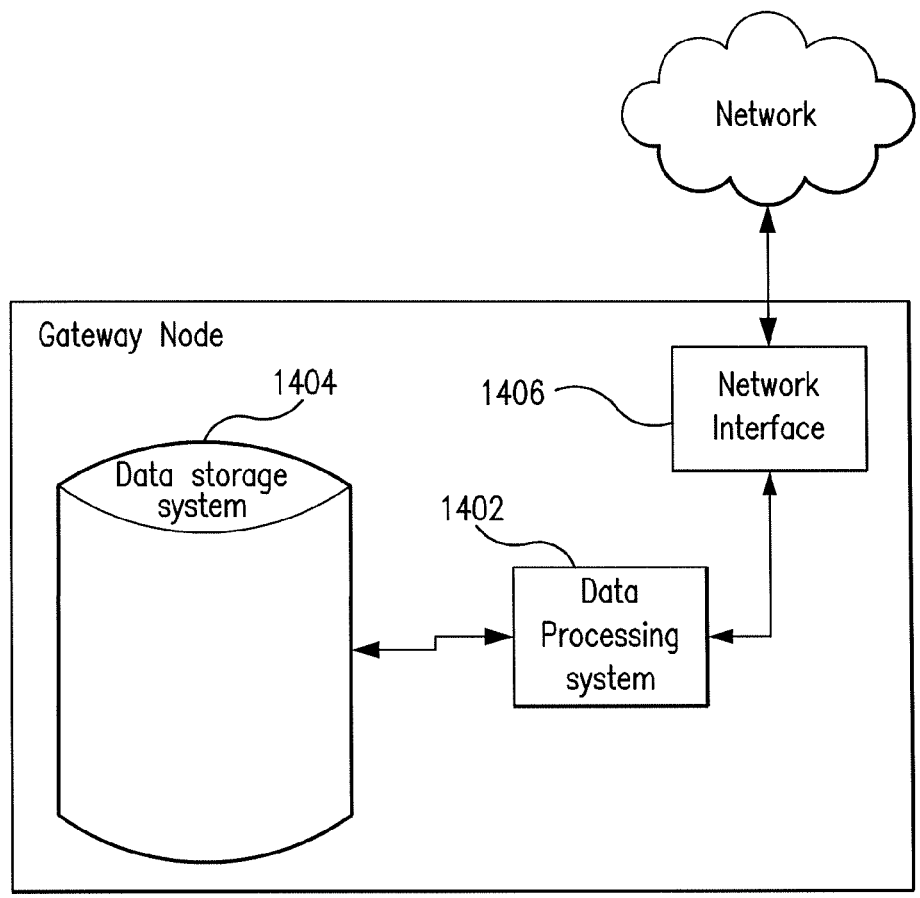
FIG. 14 illustrates and exemplary gateway node.

FIG. 13 illustrates a block diagram of an exemplary wireless device, such as device 406 shown in FIG. 4. As shown in FIG. 13, the device 406 may include: a data processing system 1302, which may include one or more microprocessors and/or one or more circuits, such as an application specific integrated circuit (ASIC), field-programmable gate arrays (FPGAs), and the like; a transceiver 1304, and a data storage system 1306, which may include one or more non-volatile storage devices and/or one or more volatile storage devices (e.g., random access memory (RAM)). According to some embodiments, the data processing system 1302 may comprise a control unit used for selection of transmission parameters.

In embodiments, where data processing system 1302 includes a microprocessor, computer readable program code (CRPC) 1308 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1302 to perform steps described above. In other embodiments, the device 406 is configured to perform steps described herein without the need for code. That is, for example, data processing system 1302 may consist merely of one or more ASICs. Hence, the features of the embodiments described herein may be implemented in hardware and/or software. For example, in particular embodiments, the functional components of the base station described above may be implemented by data processing system 1302 executing computer instructions, by data processing system 1302 operating independent of any computer instructions, or by any suitable combination of hardware and/or software.

FIG. 12 illustrates a block diagram of an exemplary gateway node such as SGW 408 and PGW 410 shown in FIG. 4. As shown in FIG. 12, the gateway node may include: a data processing system 1402, which may include one or more microprocessors and/or one or more circuits, such as an application specific integrated circuit (ASIC), field-programmable gate arrays (FPGAs), and the like; and a network interface 1406. According to some embodiments, the data processing system 1402 may comprise a control unit used for performing the functions of the gateway node.

In embodiments where data processing system 1402 includes a microprocessor, computer readable program code (CRPC) may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1402 to perform steps described above (e.g., steps described above with reference to the flow chart shown in FIG. 11). In other embodiments, the gateway node is configured to perform steps described herein without the need for code. That is, for example, data processing system 1402 may consist merely of one or more ASICs. Hence, the features of the embodiments described herein may be implemented in hardware and/or software. For example, in particular embodiments, the functional components of the base station described above may be implemented by data processing system 1402 executing computer instructions, by data processing system 1402 operating independent of any computer instructions, or by any suitable combination of hardware and/or software.

According to some embodiments, a count of the bytes lost and packets dropped, which is used to determine the rate of bytes lost and packets lost, is set to 0 or a faction between 0 and 1 of the previous count when either the timer expires or the SGW receives indication that the UE entered the ECM connected state. In some embodiments, if a bearer is deleted, the drop count for the bearer no longer applies.

While the embodiments illustrated with respect to FIGS. 5-7 are directed to LTE, these embodiments are also applicable to UTRAN/GERAN radio control nodes either using S4 SGSN or for legacy nodes where the functionality of the SGW is performed by the SGSN, and the functionality of the PGW is performed by the GGSN.

According to some embodiments, the PGW stops sending downlink data and stops charging end user downlink data between the Suspend and Resume messages. This feature eliminates very large mismatches between SGW and PGW charging records in the downlink.

In some embodiments, the SGW_Suspend_Timer value can be increased where the UE does not respond to pages multiple times. Furthermore, in some embodiments, the suspend notification and resume notification messages from the SGW can include counts of: downlink dropped packets, downlink dropped bytes, downlink forwarded packets, and/or downlink forwarded bytes.

Advantages of the embodiments described herein include a substantial improvement in accurate of charging data in the downlink direction on the PGW. Particularly, user plane data sent from the PGW towards the UE will be dropped at the SGW if the UE remains in the ECM idle state for any substantial length of time or even for short times with high data rates.

In many countries, it is illegal for an operator to knowingly over-charge an end user. Charging for data not actually sent to the UE is likely to be considered overcharging. Even in the absence of laws, customers might leave an operator that over charges for another operator's network when such overbilling is discovered, especially if the overcharging is reported by the media. Accordingly, the embodiments described herein may prevent this situation from occurring.

Today, the SGW and PGW charging records can have a high degree of mismatch in the downlink direction. Furthermore, when there is a roaming situation, the visited operator's SGW and the home operator's PGW can report very different values. This discrepancy can result in major disagreements between operators as to which record has the "correct" data. Thus, the accurate charging provided by the embodiments described herein prevents this situation.

When a UE is in the ECM idle state for long periods of time, the downlink data from the PGW to the SGW is wasting network bandwidth and packet forwarding processing power on the PGW and SGW. Accordingly, the embodiments described herein eliminate much of that waste.

Furthermore, due to the elimination of downlink user plane transmissions at the SGW, there is a reduction in S11/S4 Downlink Data Notifications for a period of time shortly after a UE fails to respond to a page. Therefore, there is a reduction in S1-AP pages messages and a reduction in RRC pages. It has been observed that most paging is due to UEs that fail to respond to pages.

Additionally, the suspend and resume messages described herein may rely on existing messaging schemes implemented on the PGW and SGW. Therefore, the PGW and SGW do not have to be modified to implement the embodiments described herein.

Although terminology from 3GPP HSPA has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP 3rd Generation Partnership Project
ACK Acknowledgement
CC Chase combining
CQI Channel Quality Information
CPC Continuous Packet Connectivity
CRC Cyclic redundancy check
DPCCH Dedicated Packet Control Channel
D-CPICH Demodulation (dedicated) Common Pilot Channel
DL Downlink
DRX Discontinuous Reception
DTX Discontinuous transmission
E-AGCH E-DPDCH Absolute Grant Channel
E-DPDCH E-DCH Dedicated Physical Control Channel
E-HICH E-DCH HARQ Ack Indicator Channel
E-TFCI Enhanced TFCI
ECM Evolved Packet System Connection Management
EPS Evolved Packet System
F-CPICH Fractional CPICH
GERAN GSM/Edge Radio Access Network
GSM Global System for Mobile Communications
HARQ Hybrid automatic repeat request
HSDPA High Speed Downlink Packet Access
HS-DPCCH High Speed dedicated physical common control channel
HSPA High Speed Packet Access
HS-PDSCH High speed Physical data shared channel
HS-SCCH High Speed Shared Control Channel
IR Incremental Redundancy
LPN Low Power Node
LTE Long Term Evolution
MIMO Multiple-Input Multiple-Out-put
MME Mobility Management Entity
MMSE Minimum Mean Square Error
NAK Non-acknowledgement
PDCCH Physical Downlink Control Channel
PDSCH Physical Downlink Shared Channel
PUCCH Physical Uplink Control Channel
PCI Precoding control index
P-CPICH Primary Common Pilot Channel
PCRF Policy and Charging Rules Function
RAM Random Access Memory
ROM Read Only Memory
SIB System Information Block
TIMO Single input multiple output
TD Time Division
TDD Time Division Duplex
TFCI Transmit Format Combination Indicator
TTI Transmit Time Interval
Tx Transmitter
UDP User Data Protocol
UE User Equipment
UL Up Link
USB Universal Serial Bus
UTRAN Universal Terrestrial Radio Access Network
WCDMA Wideband Code Division Multiple Access
WiMax Worldwide Interoperability for Microwave Access
H-RNTI High Speed Radio Network Temporary Identifier
RND Radio Network Controller
RRC Radio Resource Control
TB Transport Block
ID Identifier
W Watt

The invention claimed is:

1. A method implemented in a first node for charging of a mobile device in communication with the first node in a communications network, the method comprising:
   the first node determining a number of data packets lost between the first node and the mobile device within a predetermined period;
   the first node determining a packet loss rate using the number of data packets determined to be lost;
   the first node determining whether a first predetermined condition is met based on an evaluation of the determined packet loss rate;
   the first node transmitting, after determination that the first predetermined condition is met, a notification to a second node causing the second node to stop charging the mobile device for packets sent to the mobile device;

the first node starting a timer after transmission of the notification; and the first node transmitting a resume notification message to the second node after determination that a second predetermined condition is met, wherein the resume notification causes the second node to resume sending packets to the mobile device and to resume charging the mobile device for packets sent to the mobile device.

2. The method according to claim 1, wherein the notification is a suspend notification, and the first node stops receiving packets for the mobile device from the second node after reception of the suspend notification.

3. The method according to claim 1, wherein the notification is a pause notification, that causes the second node to stop charging the mobile device for packets transmitted for the mobile device from the second node to the first node after reception of the pause notification.

4. The method according to claim 1, wherein the first predetermined condition is met if the packet loss rate exceeds a predetermined threshold.

5. The method according to claim 1, wherein the second predetermined condition is met after reception of a signal indicating that the mobile device is in a connected state.

6. The method according to claim 1, wherein the second predetermined condition is met if the timer expires.

7. The method according to claim 1, further comprising:
resetting the determined number of data packets lost between the first node and the mobile device after transmission of the resume notification message.

8. The method according to claim 1, wherein the first node is a serving gateway (SGW) node and the second node is a packet gateway (PGW) node.

9. The method according to claim 1, wherein the first node is a serving General Packet Radio Service (GPRS) support node (SSGN) and the second node is a Gateway GPRS support node (GGSN).

10. A first node communicating with a second node and a mobile device in a communication network, the first node comprising:
a processor;
a memory coupled to the processor;
a transceiver coupled to the processor; and
an antenna coupled to the transceiver configured to transmit and receive messages, wherein the processor is configured to:

determine a number of data packets lost between the first node and the mobile device within a predetermined period, determine a packet loss rate using the number of data packets determined to be lost, determine whether a first predetermined condition is met based on an evaluation of the determined packet loss rate, transmit, after determination that the first predetermined condition is met, a notification to a second node causing the second node to stop charging the mobile device for packets sent to the mobile device, start a timer after transmission of the notification, and transmit a resume notification message to the second node after determination that a second predetermined condition is met, wherein the resume notification causes the second node to resume sending packets to the mobile device and to resume charging the mobile device for packets sent to the mobile device.

11. The first node according to claim 10, wherein the notification is a suspend notification that causes the second node to stop transmission of packets for the mobile device to the first node after reception of the suspend notification.

12. The first node according to claim 10, wherein the notification is a pause notification that causes the second node to stop charging the mobile device for packets transmitted for the mobile device from the second node to the first node after reception of the pause notification.

13. The first node according to claim 10, wherein the first predetermined condition is met if the packet loss rate exceeds a predetermined threshold.

14. The first node according to claim 10, wherein the second predetermined condition is met after reception of a signal indicating that the mobile device is in a connected state.

15. The first node according to claim 10, wherein the second predetermined condition is met if the timer expires.

16. The first node according to claim 10, wherein the processor is further configured to:
reset the number of data packets lost between the node and the mobile device after transmission of the resume notification message.

17. The first node according to claim 10, wherein the first node is a serving gateway (SGW) node and the second node is a packet gateway (PGW) node.

18. The method according to claim 1, wherein the first node is a serving General Packet Radio Service (GPRS) support node (SSGN) and the second node is a Gateway GPRS support node (GGSN).

* * * * *